US006741371B1

(12) United States Patent
Naito

(10) Patent No.: US 6,741,371 B1
(45) Date of Patent: May 25, 2004

(54) IMAGE FORMING SYSTEM, IMAGE FORMING APPARATUS, AND CONTROL METHOD THEREFOR

(75) Inventor: Hisatsugu Naito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/451,294

(22) Filed: Nov. 30, 1999

(30) Foreign Application Priority Data

Dec. 3, 1998 (JP) ............................................. 10-358402

(51) Int. Cl.⁷ ................................................. H04N 1/40
(52) U.S. Cl. ....................................... 358/471; 358/471
(58) Field of Search ................................ 358/471, 298, 358/1.8, 1.9, 474, 400, 401

(56) References Cited

U.S. PATENT DOCUMENTS 6,407,822 B1 * 6/2002 Ueda ......................... 358/1.15
6,439,682 B1 * 8/2002 Kakutani .................... 347/15

* cited by examiner

*Primary Examiner*—Edward Coles
*Assistant Examiner*—Heather D Gibb
(74) *Attorney, Agent, or Firm*—Morgan & Finnegan, L.L.P.

(57) ABSTRACT

Disclosed are an image forming system including an image reader, a printer, and a processor and a control method therefore. In this image forming system, the image reader reads an image from an original, and the printer prints the read image onto a print medium. If a "no print medium" error occurs during the printing operation by the printer, the read operation by the image reader is terminated.

12 Claims, 11 Drawing Sheets

IMAGE FORMING SYSTEM, IMAGE FORMING APPARATUS, AND CONTROL METHOD THEREFOR

BACKGROUND OF THE INVENTION

1. Field of the Invention

The present invention relates to an image forming system, image forming apparatus, and control method therefor and, more particularly, to an image forming system, image forming apparatus, and control method therefor suitably applicable to a copying machine or the like which is a composite apparatus of, e.g., a scanner (image reading device) for photoelectrically reading an original image and a printer for forming a copied image on the basis of image data.

2. Description of the Related Art

A variety of conventional high-speed, high-quality printers such as ink jet printers and laser beam printers have been proposed as output terminals of personal computers and workstations. Also, high-speed, high-resolution scanners and the like for inputting image data have been developed and put into practical use. Along with this stream, the stream of a multifunctional printer is advancing which integrates a scanner as one conventional standalone input terminal and a printer as one conventional standalone output terminal into a single composite apparatus. As a consequence, it is beginning to be possible to easily form copied images.

Unfortunately, the abovementioned prior art has the following problem. That is, in the multifunctional printer described above, an image processor performs a copying operation while independently communicating with a printer and a scanner. Therefore, even if a paper sheet supplied to the printer is different from a desired paper sheet and a "no paper" error occurs during the copying operation, the scanner performs scanning in accordance with the initial settings. Consequently, it takes a long time before the multifunctional printer is released from the job.

SUMMARY OF THE INVENTION

The present invention has been made in consideration of the above situation, and has as its object to provide an image forming system and its control method which when a "no print sheet" error occurs in a printer during a copying operation, can rapidly start the next copying operation.

According to the present invention, the foregoing object is attained by providing an image forming system comprising: an image reader for reading an image from an original; a printer for printing the image read by the image reader onto a print medium; and a processor for terminating the read operation by the image reader if a "no print medium" error occurs during the printing operation by the printer.

According to the present invention, the foregoing object is also attained by providing a control method of an image forming system comprising an image reader, a printer, and a processor, comprising: the image reading step of reading an image from an original by using the image reader; the printing step of printing the image read in the image reading step onto a print medium by using the printer; and the termination step of terminating the image reading step by using the processor if a "no print medium" error occurs in the printer during the printing step.

In the above arrangements, even if print media are used up in the printer during a copying operation in which the image reader reads an image and the read image data is printed, the image read operation by the image reader is immediately terminated. Hence, the next copying operation can be rapidly started.

Preferably, control is so performed that the image reading means is returned to the initial standby position at the same time the read operation is terminated. With this arrangement, even if print media are used up in the printer during a copying operation in which the image reader reads an image and the processor sequentially converts the read image data into print data and transfers the print data to the printer to perform printing, the image read operation by the image reader is terminated, and the image reading means is returned to the initial standby position. Accordingly, the next copying operation can be rapidly started.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

Figure 3:
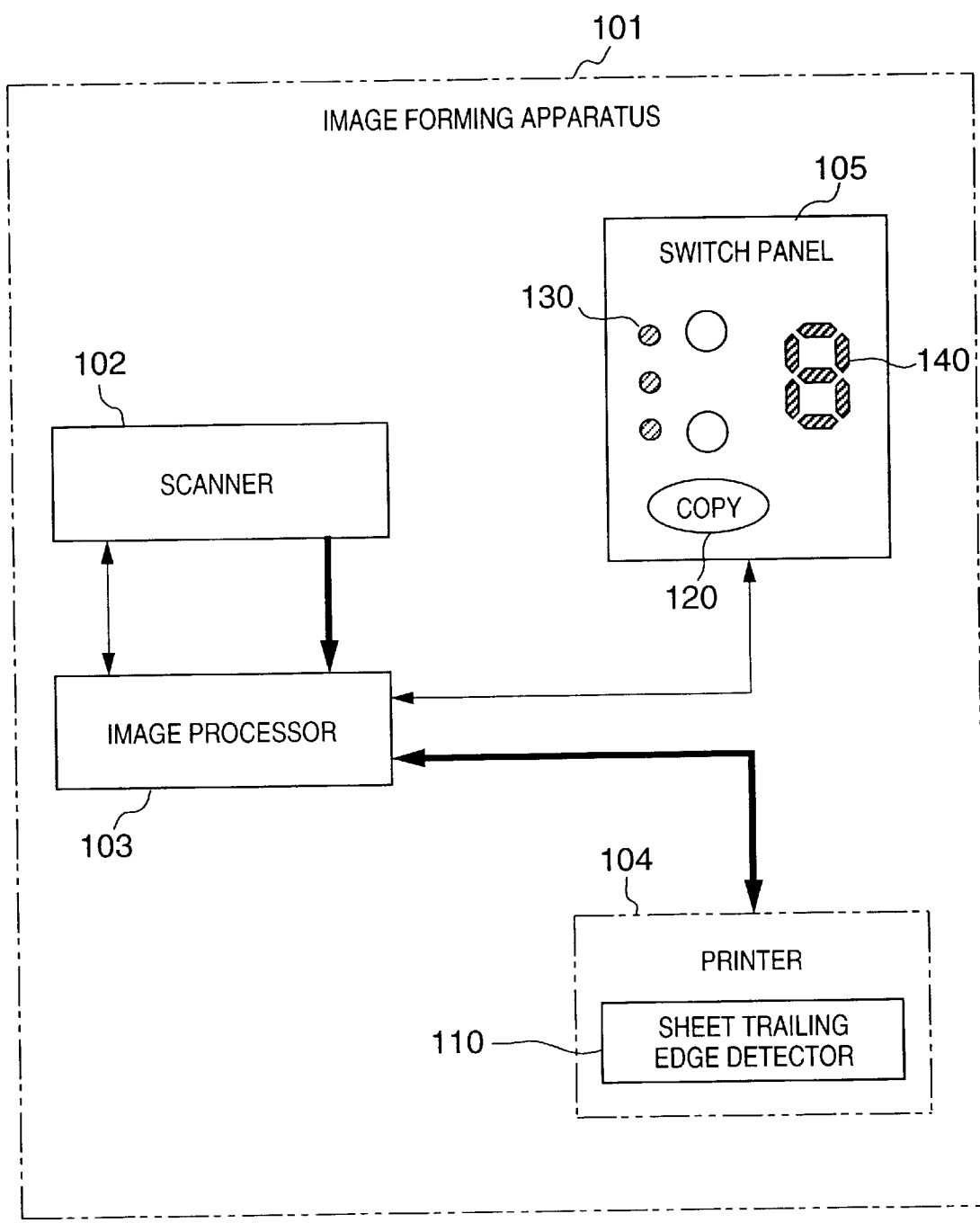
FIG. 3 is a block diagram showing an outline of the arrangement of the image forming apparatus according to the first and second embodiments of the present invention.

FIG. 3 is a block diagram showing an outline of the arrangement of an image forming apparatus according to the embodiments of the present invention. An image forming apparatus 101 according to the embodiments of the present invention is constructed as a composite apparatus which includes a scanner 102, an image processor 103, and a printer 104, each having an independent function, and also has a switch panel 105 in an apparatus operating section.

The arrangements of the above components will be described in detail below. The scanner 102 optically reads an image from an original. The image processor 103 perform image processing, such as binarization, edge emphasis, and C(Cyan)M(Magenta)Y(Yellow) conversion, for R(Red)G(Green)B(Blue) image data from the scanner 102, thereby converting the RGB image data into printing data to be transmitted to the printer 104. In the embodiments of the present invention, an I-MPU 621 (to be described later) of the image processor 103 executes, on the basis of control programs, internal periodic interrupt processing during copying, an image information data writing process for the printer during copying, a printer error information acquiring process during copying, and image data processing.

The image processor 103 and the scanner 102 are connected via a bidirectional serial interface for controlling the scanner and a (unidirectional) parallel data bus for transferring scan data. The image processor 103 transmits image information data for printing and image data via a data line of a parallel interface based on IEEE (Institute of Electrical and Electronics Engineers) 1284 and receives printer error information in the form of data from the printer 104 by using a nibble mode of a parallel interface complying with IEEE 1284. The image processor 103 is also connected to the switch panel 105 to allow an operator to perform settings via switches on the switch panel 105 and display to the operator internal information of the image forming apparatus on a display unit such as an LED.

The printer 104 receives converted printing data from the image processor 103 and prints out the data on a print sheet. The printer 104 is connected to the image processor 103 via a parallel interface complying with IEEE 1284. The printer 104 incorporates a sheet trailing edge detector 110 which uses a sheet sensor and detects the trailing edge of a print sheet. The switch panel 105 includes a copy key 120 which an operator presses to perform copying by using the image forming apparatus 101, switches 130 for setting various conditions, and a display unit 140 such as an LED for displaying internal information of the image forming apparatus.

Figure 2:
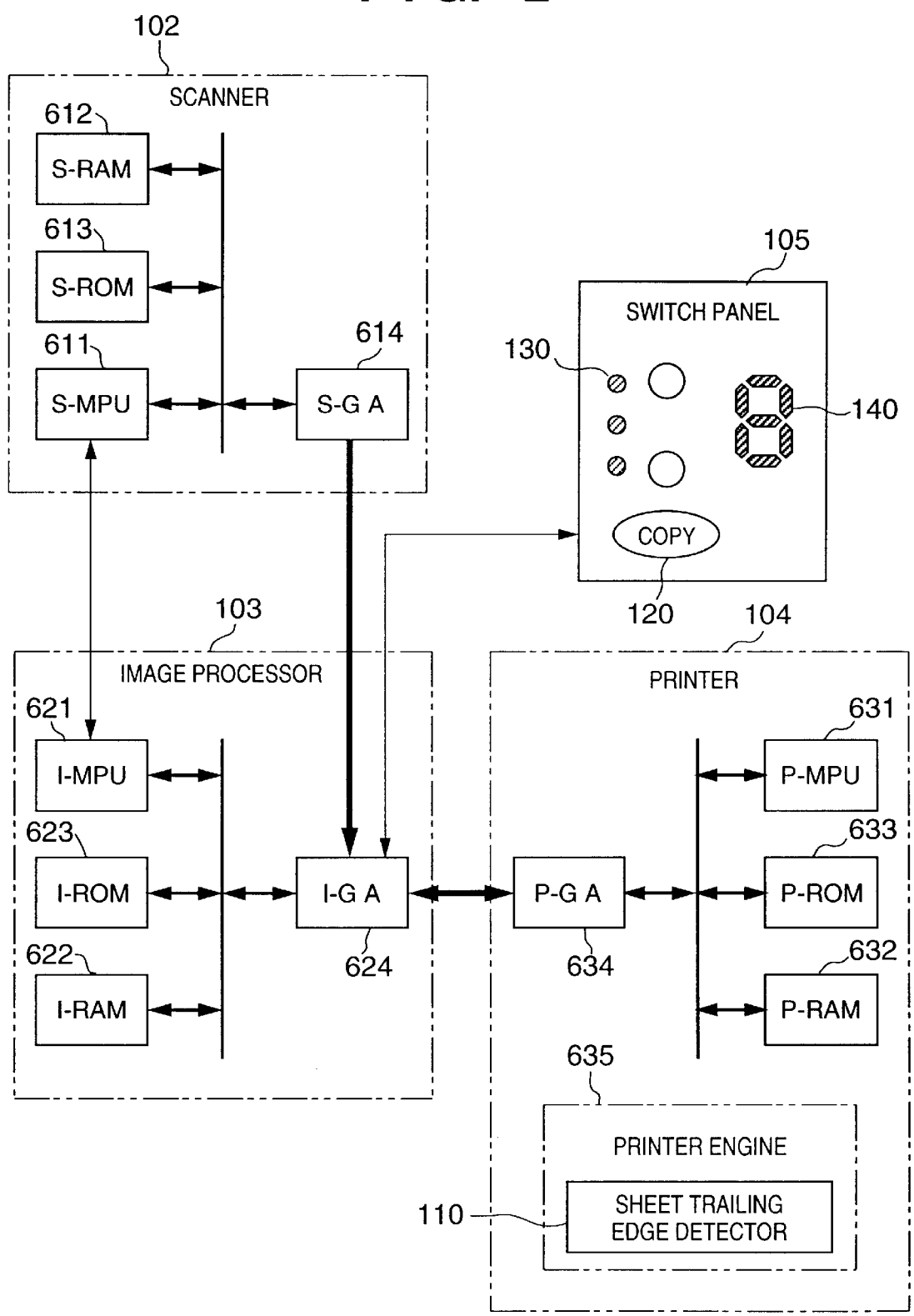
FIG. 2 is a block diagram showing details of the arrangement of the image forming apparatus according to the first and second embodiments of the present invention.

FIG. 2 is a block diagram showing details of the arrangement of the image forming apparatus 101 according to the embodiments of the present invention shown in FIG. 3. The scanner 102 constructing the image forming apparatus according to the embodiments of the present invention includes an S-MPU 611, S-RAM 612, S-ROM 613, and an S-GA (Gate Array) 614. The image processor 103 constructing the image forming apparatus includes an I-MPU 621, I-RAM 622, I-ROM 623, and an I-GA (Gate Array) 624. The printer 104 constructing the image forming apparatus includes a P-MPU 631, P-RAM 632, P-ROM 633, a P-GA (Gate Array) 634, and a printer engine 635.

The components of the scanner 102 will be described in detail below. The S-MPU 611 is a controller in the form of a microprocessor for performing main control of the scanner 102. The S-RAM 612 is random access memory used as a work area for the S-MPU 611 and as a buffer of read image data. The S-ROM 613 is read-only memory storing programs corresponding to read control procedures and the like executed by the S-MPU 611, tables, and permanent data having default values (standard values when no command parameters are set). The S-GA 614 is a gate array as a composite control unit.

In the image processor 103, the I-MPU 621 is a controller in the form of a microprocessor for performing main control of the image processor 103. The I-RAM 622 is random-access memory used as a work area for the I-MPU 621 and as a buffer for writing printing data formed by processing read image data. The I-ROM 623 is read-only memory storing programs corresponding to copying operation control procedures and the like executed by the I-MPU 621 and permanent data having default values. The I-GA 624 is a gate array as a composite control unit for performing processing, such as binarization, edge emphasis, and CMY conversion, for RGB image data from the scanner 102.

In the printer 104, the P-MPU 631 is a controller in the form of a microprocessor for performing main control of the printer 104. The P-RAM 632 is random access memory having areas such as a work area for the P-MPU 631, a receiving buffer for storing data received from the image processor 103 via the parallel interface, and a printing buffer for storing printing data of one line from the received data. The P-ROM 633 is read-only memory storing programs corresponding to printing control procedures and the like executed by the P-MPU 631, tables, and permanent data having default values. The P-GA 634 is a gate array as a composite control unit for performing, e.g., head control, for a printing operation. The printer engine 635 prints data on a paper sheet by using a printhead.

Figure 1:
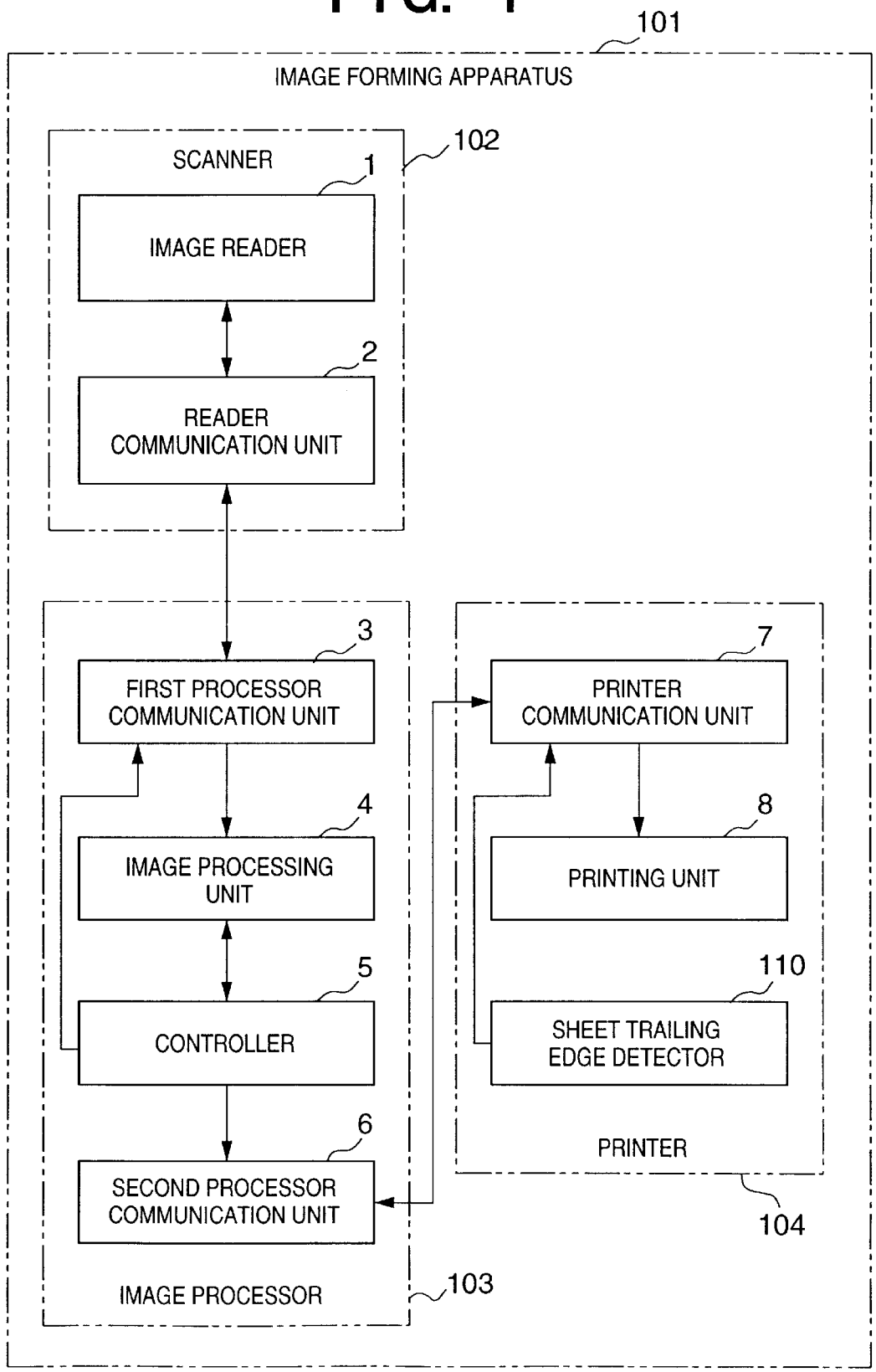
FIG. 1 is a block diagram showing the functional arrangement of an image forming apparatus according to the first and second embodiments of the present invention.

FIG. 1 is a block diagram showing the functional arrangement of the image forming apparatus 101 according to the present invention shown in FIGS. 2 and 3. The image forming apparatus 101 includes the scanner 102 having an image reader 1 (in this embodiment, an image reading system including a read head) and a reader communication unit 2, the image processor 103 having a first processor communication unit 3, an image processing unit 4, a controller 5 (in this embodiment, the I-MPU 621), a second processor communication unit 6 (in the second embodiment to be described later, a parallel interface controller 1201), and the printer 104 having a printer communication unit 7 (in the second embodiment, a printer interface 1202), a printing unit 8 (corresponding to the printer engine 635 in FIG. 2), and the sheet trailing edge detector 110.

The image reader 1 of the scanner 102 photoelectrically reads an image from an original and converts the read image into electrical multilevel image data. The reader communication unit 2 of the scanner 102 transfers the multilevel image data converted by the image reader 1 to the image processor 103.

The first processor communication unit 3 of the image processor 103 receives the multilevel image data transferred from the scanner 102 and transmits a read operation termination instruction to the scanner 102. The image processing unit 4 of the image processor 103 performs image processing, such as binarization and resolution conversion, for the multilevel image data.

While the scanner 102 is performing image reading, the image processor 103 is performing image processing, or the printer 104 is performing printing, if the controller 5 of the image processor 103 receives from the printer 104 error information indicating that the trailing edge detector 110 of the printer 104 detects the absence of paper sheets on the basis of sheet trailing edge detection, the controller 5 terminates the read operation by the image reader 1 of the scanner 102 and returns the image reader 1 to the initial standby position (the first embodiment). Also, while the scanner 102 is performing image reading, the image processor 103 is performing image processing, or the printer 104 is performing printing, the controller 5 checks the status of a signal line between the image processor 103 and the printer 104 and, if the controller 5 determines from the signal line status that the trailing edge detector 110 of the printer 104 detects the absence of paper sheets on the basis of sheet trailing edge detection, the controller 5 terminates the read operation by the image reader 1 of the scanner 102 and returns the image reader 1 to the initial standby position (the second embodiment).

The second processor communication unit 6 of the image processor transfers printing data based on the image processing by the image processing unit 4 to the printer 104.

The printer communication unit 7 of the printer 104 receives the printing data transferred from the image processor 103 and transmits error information indicating the absence of paper sheets to the image processor. The printing unit 8 of the printer 104 prints the printing data on a paper sheet. The trailing edge detector 110 of the printer 104 detects the trailing edge of a paper sheet.

First Embodiment

Various processes during copying according to the first embodiment of the present invention executed by the image forming apparatus 101 with the above arrangement will be described below with reference to FIGS. 2, 3, and 4 to 9.

Figure 4:
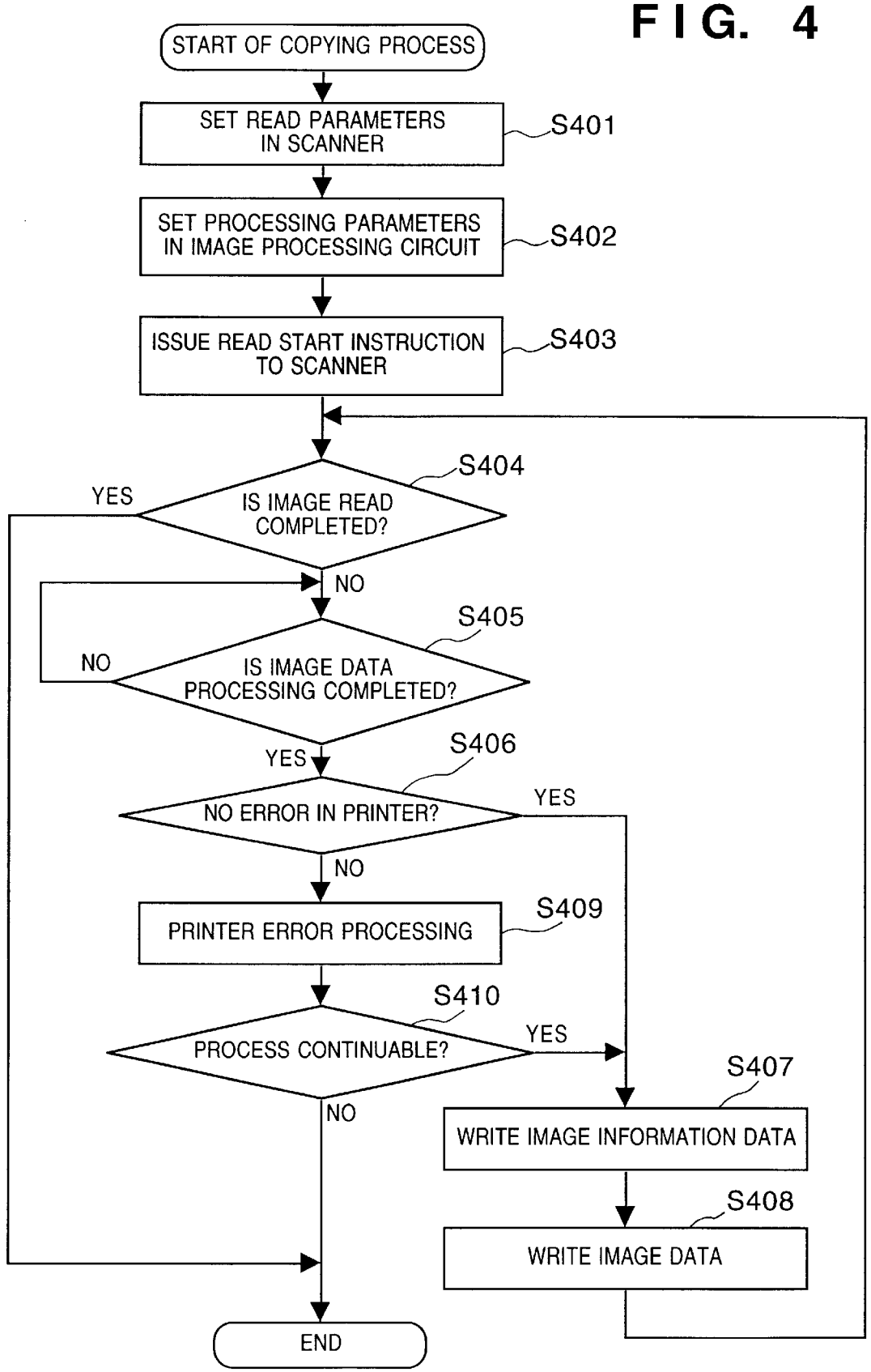
FIG. 4 is a flow chart showing internal processing of an image processor during copying in the image forming apparatus according to the first embodiment of the present invention.

FIG. 4 is a flow chart showing internal processing of the image processor 103 during copying in the image forming apparatus 101 according to the first embodiment of the present invention. The copying operation is started when the copy key 120 of the switch panel 105 of the image forming apparatus shown in FIGS. 2 and 3 is pressed.

First, in step S401, read parameters based on settings previously selected by the switches on the switch panel 105 are set in the scanner 102. By transmitting a parameter setting command via the serial interface, image read resolutions in a main scan direction/sub-scan direction of the scanner 102, read areas in the main scan direction/sub-scan direction, and RGB multilevel/monochromatic gray scale read are set. In step S402, parameters for processing by an image processing circuit of the image processor 103 are set. In step S403, a scanning start command is transmitted to the scanner 102 via the serial interface, and the scanner 102 starts a read operation. The scanner 102 transmits image data obtained by the read operation to the image processor 103 via the parallel data bus.

In step S404, whether image data initially set to read in the scanner 102 is transferred is checked on the basis of the number of parallel data transferred, thereby checking whether the read operation is completed. If the read operation is completed (YES in step S404), the processing by the image processor 103 is completed. If the read operation is not completed (NO in step S404), the flow advances to step S405 to check, on the basis of a formation 25 end bit of an internal register of the image processor 103, whether image processor 103 processes, in units of lines, the RGB image data transferred from the scanner 102 and forms CMYK print data of one line to be transferred to the printer 104. If the formation of one line is completed, the flow advances to step S406 to check whether there is an error in the printer 104.

If it is determined in step S406 that there is no error in the printer 104, the flow advances to step S407 to transfer additional information data for printing the CMYK print data to the printer 104. After that, in step S408 the CMYK print data is transferred. If it is determined in step S406 that there is an error in the printer 104, the flow advances to step S409 to perform error processing for the printer 104. In step S410, whether the error processing indicates that the process is continuable is checked. If the error allows the process to be continued, the flow returns to step S407 to transfer the additional information data, and in step S408 the CMYK print data is transferred. If the error does not allow the process to be continued, this process is terminated.

Figure 5:
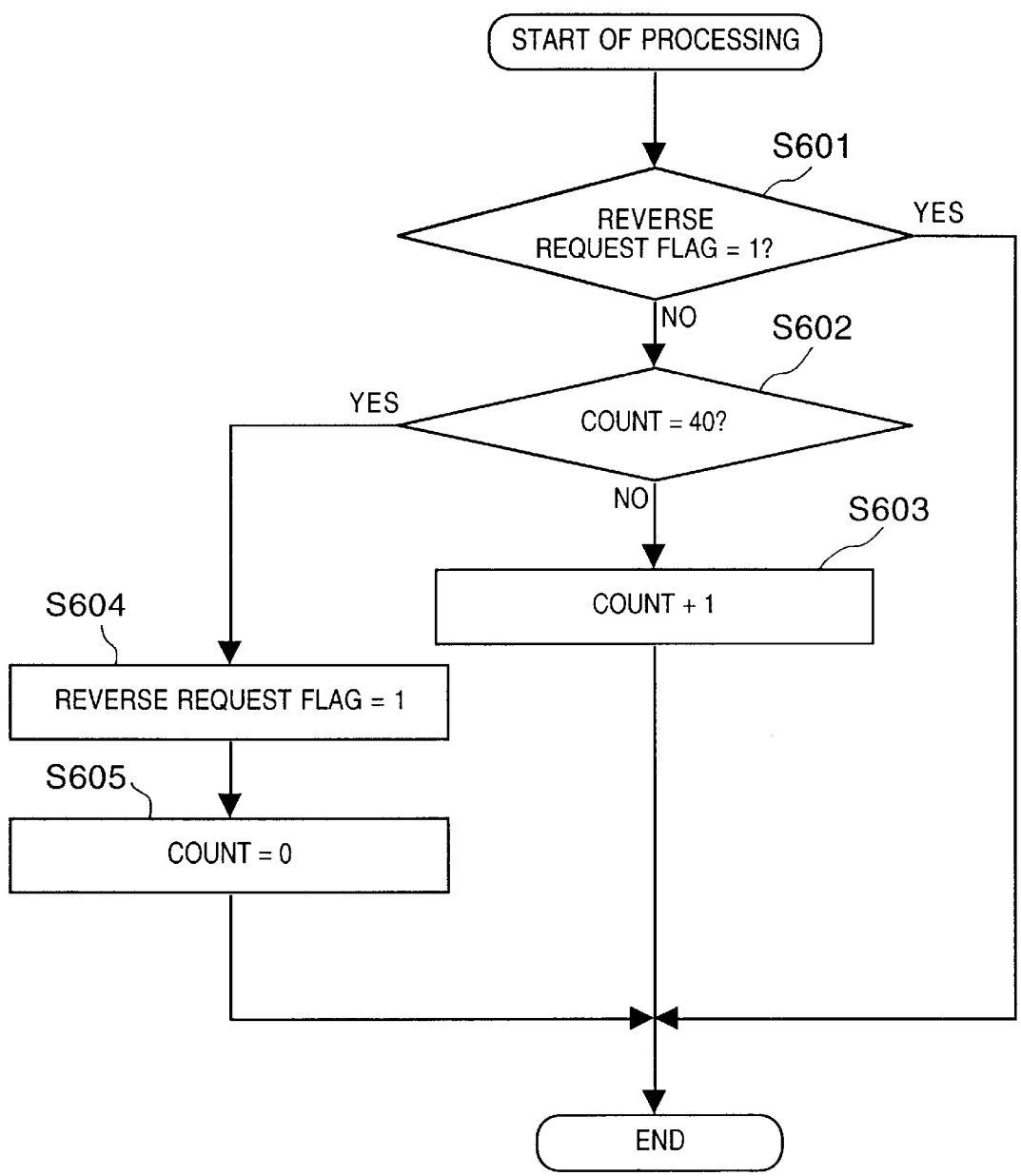
FIG. 5 is a flow chart showing internal periodic interrupt processing of the image processor during copying in the image forming apparatus according to the first embodiment of the present invention.

FIG. 5 is a flow chart showing internal periodic interrupt processing of the image processor 103 during copying in the image forming apparatus according to the first embodiment of the present invention. That is, in this processing the I-MPU 621 of the image processor 103 periodically generates an opportunity for collecting error information from the printer 104 during copying. For example, in timer interrupt processing generated at a period of 100 msec, the I-MPU 621 raises a flag when four seconds have elapsed, clears the flag, again raises the flag when four seconds have elapsed, and so on.

First, in step S601 the I-MPU 621 checks whether a reverse request flag is 1. Since the flag starts from 0, the flow advances to step S602, and the I-MPU 621 checks whether a counter is equal to 40. Since the counter also starts from 0 and hence is not 40, the flow advances to step S603, and the I-MPU 621 increments the count by +1 and completes the processing. When this processing is repeated every 100 msec, count =40 is obtained in step S602 for the 41st time. Accordingly, the I-MPU 621 sets the reverse request flag to 1 in step S604 and clears the count to 0 in step S605. After that, reverse request flag=1 holds in step S601 unless the reverse request flag is cleared in step S703 of FIG. 6 (to be described later). Therefore, the I-MPU 621 completes the processing without any operation.

Figure 6:
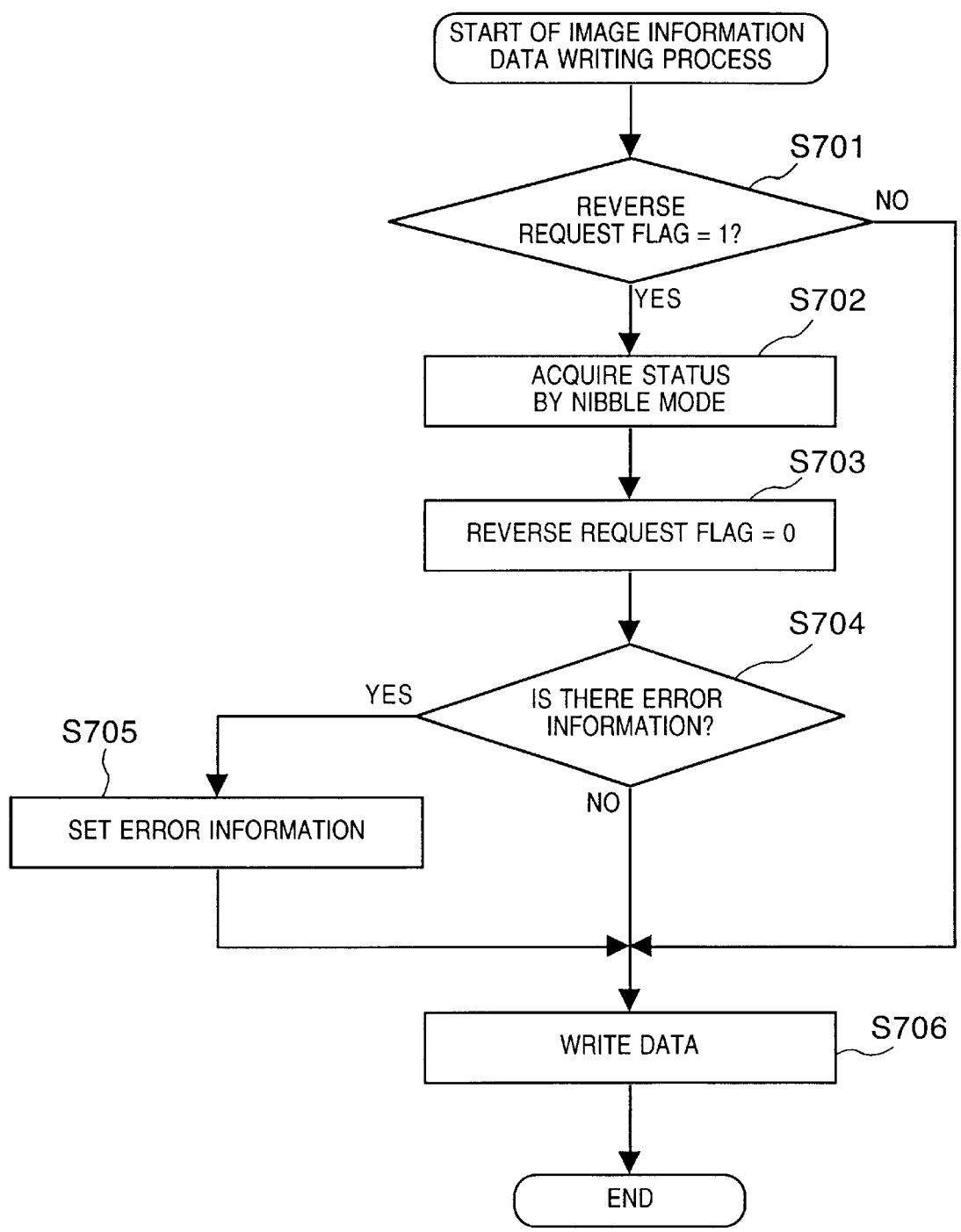
FIG. 6 is a flow chart showing an image information data writing process which the image processor performs for a printer during copying in the image forming apparatus according to the first embodiment of the present invention.

FIG. 6 is a flow chart showing an image information data writing process performed for the printer 104 of the image processor 103 during copying in the image forming apparatus 101 according to the first embodiment of the present invention. That is, this flow chart shows the process of transferring the additional information data for printing the CMYK print data to the printer 104 in step S407 of the processing (FIG. 4) during copying.

First, whether the reverse request flag is 1 is checked in step S701. If the reverse request flag is 1, this means that there is a reverse request, so the flow advances to step S702. In step S702, the parallel interface based on IEEE 1284, which is the interface with the printer 104, is switched to the nibble mode to receive information from the printer 104. After the information from the printer 104 is received, the reverse request flag is cleared to 0 in step S703. In step S704, if the received information from the printer 104 contains error information of the printer 104, the flow advances to step S705 to set the error information. Regardless of whether error information is found in step S704 or not, the additional information data for printing the CMYK print data is finally transferred in step S706, and the process is completed.

Figure 7:
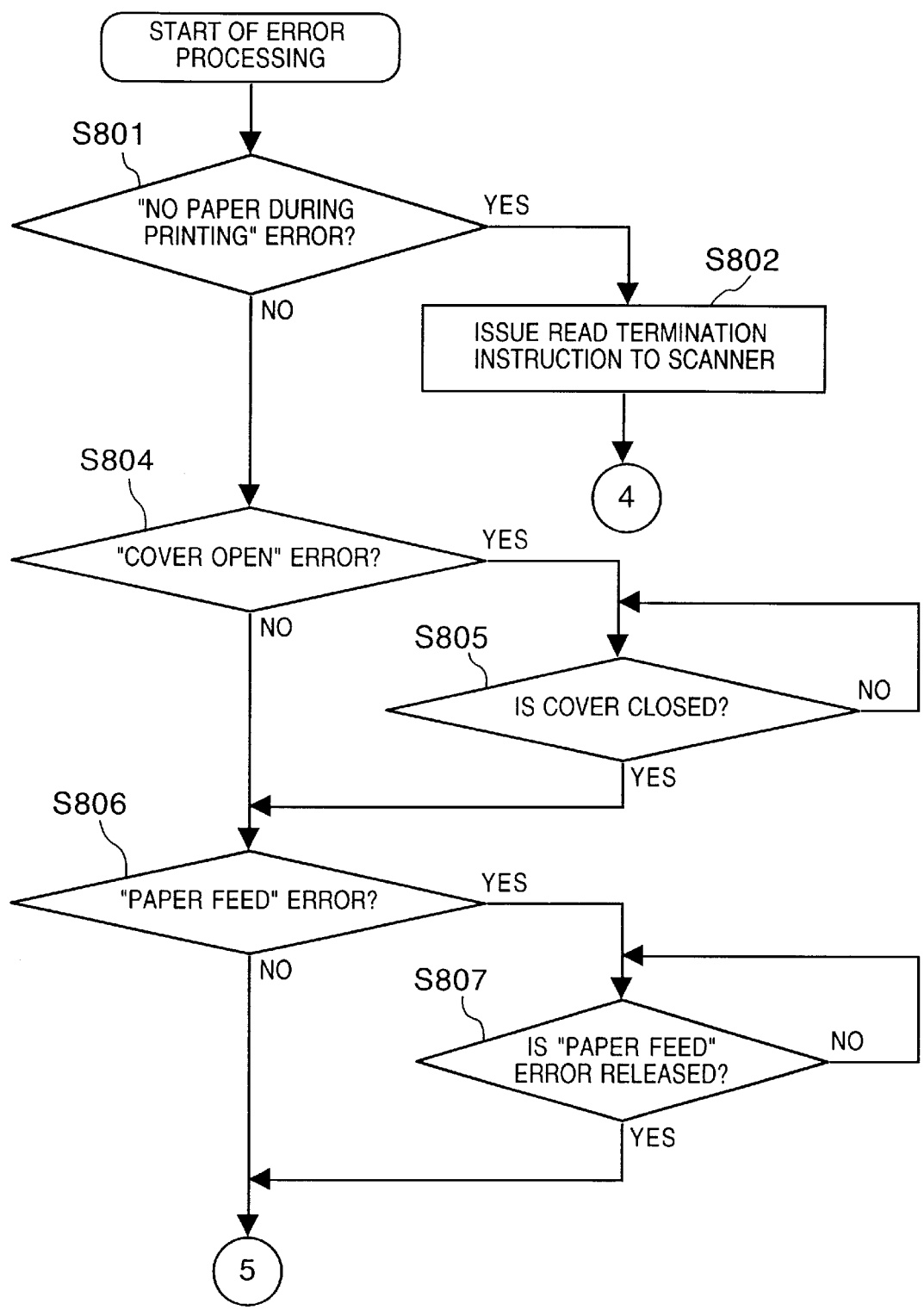
FIG. 7 is a flow chart showing a printer error information acquiring process performed by the image processor during copying in the image forming apparatus according to the first embodiment of the present invention.
Figure 8:
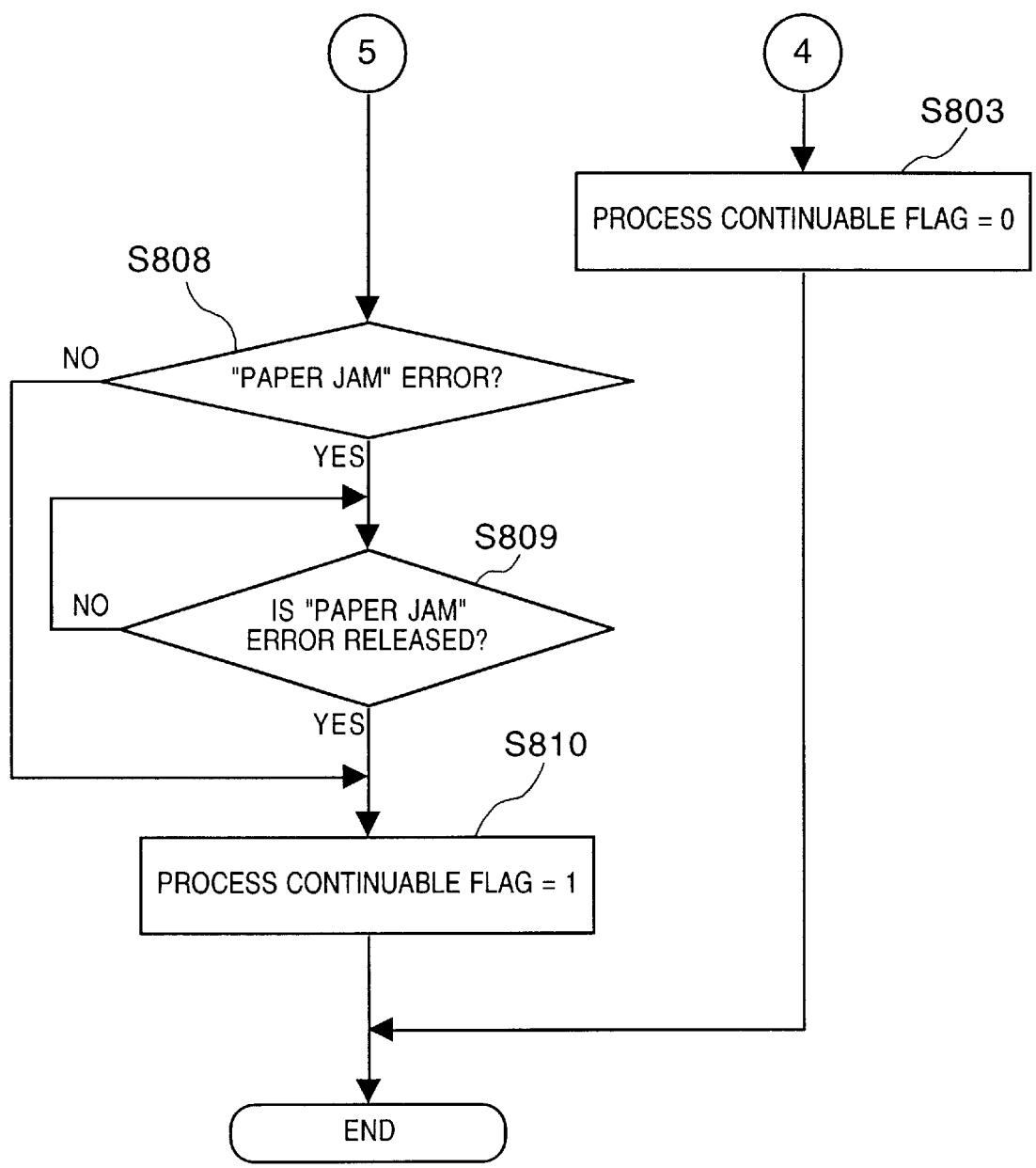
FIG. 8 is a flow chart showing the printer error information acquiring process performed by the image processor during copying in the image forming apparatus according to the first embodiment of the present invention.

FIGS. 7 and 8 are flow charts showing a printer error information acquiring process executed by the image processor 103 during copying in the image forming apparatus 101 according to the first embodiment of the present invention.

First, whether an error currently occurring is a "no paper during printing" error is checked in step S801. If the error is a "no paper during printing" error, a read termination instruction for terminating the read operation currently being executed is issued to the scanner 102 in step S802. After this read termination instruction is issued, a process continuable flag is cleared in step S803, and the process is completed. Consequently, when the sheet trailing edge detector 110 of the printer 104 detects the sheet training edge, the scanner 102 terminates the read operation and returns to the standby position. If the error occurring is not a "no paper during printing" error in step S801, whether the error is a "cover open" error by which the cover of the printer 104 is open is checked in step S804. If the error is a "cover open" error, the flow advances to step S805 and loops until this "cover open" error is recovered.

If the error occurring is not a "cover open" error in step S804, whether the error is a "paper feed" error by which a paper sheet is not appropriately fed in the printer 104 is checked in step S806. If the error is a "paper feed" error, the flow advances to step S807 and loops until the "paper feed" error is recovered. If the error occurring is not a "paper feed" error in step S806, whether the error is a "paper jam" error is checked in step S808. If the error is a "paper jam" error, the flow advances to step S809 and loops until the "paper jam" error is recovered. If the error is not a "paper jam" error in step S808, this means that the error is recovered or is a minor one. Therefore, in step S810, the process continuable flag is set, and the process is completed.

Figure 9:
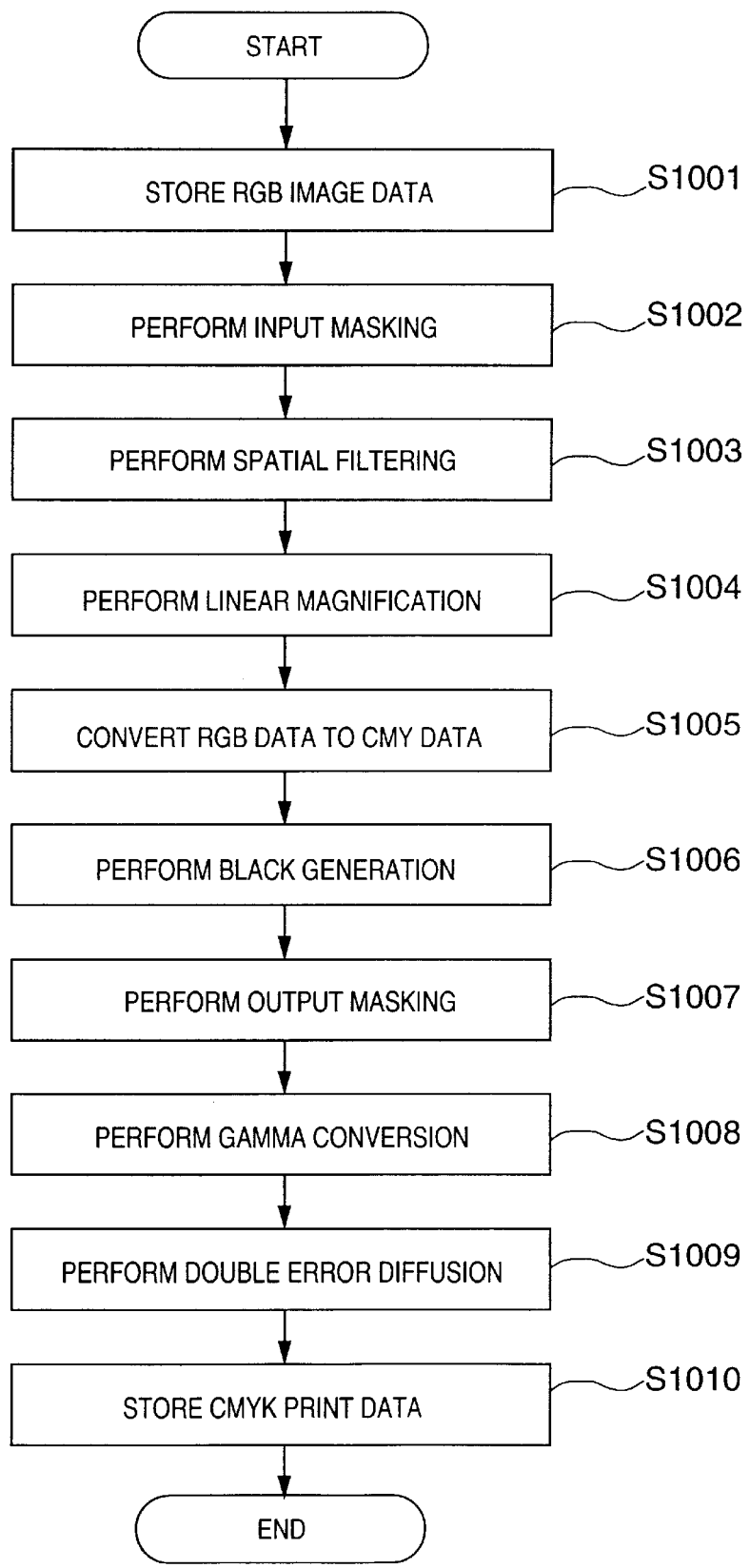
FIG. 9 is a flow chart showing internal image data processing of the image processor in the image forming apparatus according to the first embodiment of the present invention.

FIG. 9 is a flow chart showing the flow of internal image data processing of the image processor 103 in the image forming apparatus 101 according to the first embodiment of the present invention.

First, in step S1001, input RGB image data from the scanner 102 is temporarily stored in units of lines in the I-RAM 622 of the image processor 103. In step S1002, input masking is performed for the RBG image data stored in the I-RAM 622 to correct the RBG image data from the scanner 102. In step S1003, spatial filtering is performed and, if the operator designates from the switch panel 105, edge emphasis and the like are also performed. In addition, if the operator designates magnification change from the switch panel 105, the data is magnified while being linearly interpolated in step S1004. In step S1005, the RGB data is converted into CMY data for the printer 104.

In step S1006, black generation is performed to generate K (black) data from the data converted into CMY data in step S1005. In step S1007, output masking corresponding to the color characteristics of CMY inks is performed for the CMYK data. In step S1008, color adjustment (gamma conversion) corresponding to the gamma characteristic of the printer 104 is performed. In step S1009, CMYK binary error diffusion is performed for the color-adjusted data. In step S1010, the data is temporarily stored, as data in units of lines for the printer 104, in the internal output buffer of the I-RAM 622.

In the above arrangement, if the sheet trailing edge detector 110 of the printer 104 constructing the image forming apparatus 101 detects the trailing edge of a print sheet, the printer 104 transmits error information to the image processor 103 via the bidirectional parallel interface complying with IEEE 1284. The image processor 103 constructing the image forming apparatus 101 transmits print data to the printer 104 and receives the error information from the printer 104 via the bidirectional parallel interface complying with IEEE 1284. If the image processor 103 receives error information indicating a "no paper" error from the printer 104, the image processor 103 transmits a read operation termination instruction to the scanner 102. When receiving this read operation termination instruction from the image processor 103, the scanner 102 constructing the image forming apparatus 101 terminates a read operation even after the operation is started and returns the image reader 1 to the standby position.

Accordingly, during a copying operation in which the scanner 102 reads an image and the image processor 103 sequentially converts RGB image data into CMYK data for printing data and transfers the converted data to the printer 104 to perform printing, even if a "no paper" error occurs in the printer 104, discharges a print sheet, the image read operation by the scanner 102 is immediately terminated and a read head (one component of the scanner 102) is returned to the initial standby position. This allows rapid start of the next copying operation.

Second Embodiment

The second embodiment will be described below.

In the first embodiment of the present invention described above, the image processor 103 checks the absence of paper sheets in the printer 104 as follows. That is, by using the nibble mode of the bidirectional parallel interface complying with IEEE 1284 between the image processor 103 and the printer 104, the image processor 103 (host) receives data (error information) from the printer 104 (peripheral device) and analyzes the contents of the data. When finding the absence of paper sheets, the image processor 103 transmits a read operation termination instruction to the scanner 102.

The bidirectional parallel interface complying with IEEE 1284 between the image processor 103 and the printer 104 includes five types of signals, Select, nfault, Busy, nAck, and PE, as control signal lines from peripheral devices. Of these signals, a PE signal can also be so controlled as to indicate the presence/absence of a paper sheet of the printer 104. Accordingly, the aforementioned control can be performed by using the level of this PE signal. In the second embodiment of the present invention, the above control is realized by the level of this PE signal.

Figure 10:
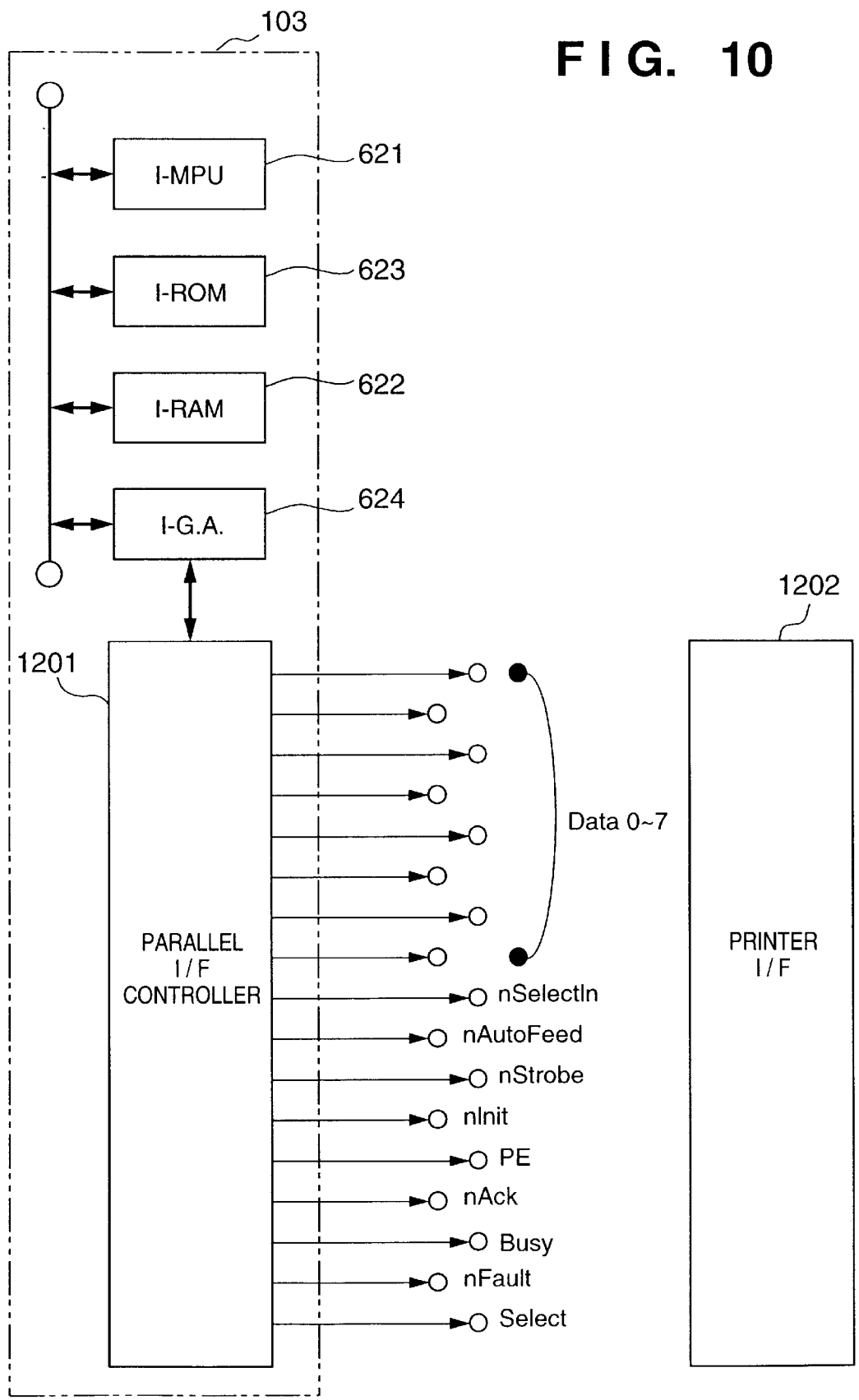
FIG. 10 is a block diagram showing details of the arrangement of an interface between an image processor and a printer in the image forming apparatus according to the second embodiment of the present invention.

FIG. 10 is a block diagram showing details of the arrangement of an interface between the image processor 103 and the printer 104 in the image forming apparatus according to the second embodiment of the present invention. In FIG. 10, reference numeral 1201 denotes a parallel interface controller of the image processor 103; and 1202, a printer interface of the printer 104. As shown in FIG. 10, the PE signal and other various signals are exchanged between the parallel interface controller 1201 of the image processor 103 and the printer interface 1202 of the printer 104.

Figure 11:
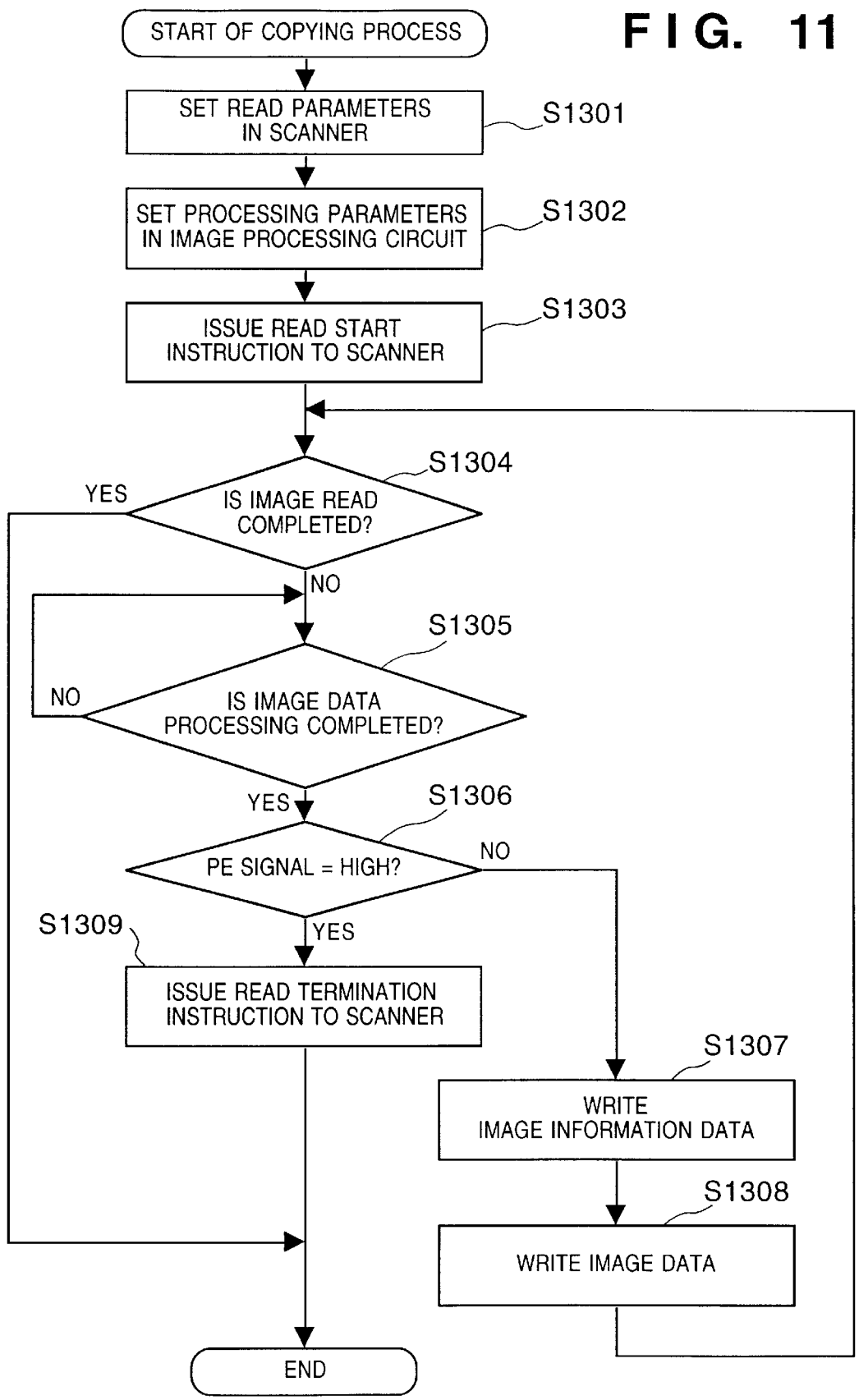
FIG. 11 is a flow chart showing internal processing of the image processor during copying in the image forming apparatus according to the second embodiment of the present invention.

FIG. 11 is a flow chart showing internal processing of the image processor 103 during copying in the image forming apparatus 101 according to the second embodiment of the present invention. A copying operation is started when the copy key 120 of the switch panel 105 of the image forming apparatus 101 shown in FIGS. 2 and 3 is pressed.

First, in step S1301 read parameters based on settings previously selected by the switches on the switch panel 105 are set in the scanner 102. By transmitting a parameter setting command via the serial interface, image read resolutions in a main scan direction/sub-scan direction of the scanner 102, read areas in the main scan direction/sub-scan direction, and RGB, multilevel/monochromatic gray scale read are set. In step S1302, parameters for processing by the image processing unit 4 of the image processor 103 are set. In step S1303, a scanning start command is transmitted to the scanner 102 via the serial interface, and the scanner 102 starts a read operation. The scanner 102 transmits the image data to the image processor 103 via the parallel data bus.

In step S1304, whether image data initially set to read in the scanner 102 is transferred is checked on the basis of the number of parallel data transferred, thereby checking whether the read operation is completed. If the read operation is not completed, the flow advances to step S1305 to check, on the basis of a formation end bit of an internal register of the image processor 103, whether the image processor 103 processes, in units of lines, the RGB image data transferred from the scanner 102 and forms CMYK print data of one line to be transferred to the printer 104. If the formation of one line is completed, the flow advances to step S1306 to check whether the PE signal of the printer 104 is High or Low.

If the PE signal of the printer 104 is Low in step S1306, this does not mean the absence of a paper sheet (=the presence of a paper sheet). Therefore, in step S1307, additional information data for printing the CMYK print data is transferred to the printer 104. After that, in step S1308, the CMYK print data is transferred. If the PE signal of the printer 104 is High in step S1306, this means that the printer 104 has used up paper sheets during printing. Hence, a read termination instruction for stopping the read operation currently being executed is issued to the scanner 102 in step 1309, and the copying process is completed.

In the above arrangement, if the sheet trailing edge detector 110 of the printer 104 constructing the image forming apparatus 101 detects the trailing edge of a print sheet, the printer 104 transmits a signal indicating the absence of paper sheets to the image processor 103 via the bidirectional parallel interface complying with IEEE 1284. The image processor 103 constructing the image forming apparatus 101 transmits printing data to the printer 104 and checks the status of the signal line between the image processor 103 and the printer 104. If the image processor 103 determines on the basis of the status of the signal line that the printer has used up paper sheets, the image processor 103 transmits a read operation termination instruction to the scanner 102. When receiving this read operation termination instruction from the image processor 103, the scanner 102 constructing the image forming apparatus 101 terminates a read operation even after the operation is started and returns the image reader 1 to the standby position.

Accordingly, during a copying operation in which the scanner 102 reads an image and the image processor 103 sequentially converts RGB image data into CMYK data for printing data and transfers the converted data to the printer 104 to perform printing, even if a "no paper" error occurs in the printer 104, the printer 104 discharges a print sheet, the image read operation by the scanner 102 is immediately terminated and a read head (one component of the scanner 102) is returned to the initial standby position. This allows rapid start of the next copying operation.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore to apprise the public of the scope of the present invention, the following claims are made.

What is claimed is:

1. An image forming system comprising:
    an image reader adapted to read an image of an original, said image reader comprising an image reading unit adapted to photoelectrically read the image of the original and convert the read image into electrical image data;
    a printer adapted to print the image read by said image reader onto a paper sheet based on the electrical image data, said printer comprising a trailing edge detecting unit adapted to detect a trailing edge of a paper sheet;
    a determining unit adapted to determine whether or not said trailing edge detecting unit detects the trailing edge of the paper sheet; and
    a processor adapted to terminate the read operation by said image reader and return said image reading unit to an initial standby position in a case where said determining unit determines that said trailing edge detecting unit detects the trailing edge of the paper sheet during the printing operation by said printer.

2. The system according to claim 1, wherein
    said image reader comprises a first communication unit adapted to transfer the image data to said processor,
    said processor comprises a second communication unit adapted to receive the image data transferred from said image reader and to transmit a read operation termination instruction to said image reader, an image processing unit adapted to perform predetermined image processing for the image data, and a third communication unit adapted to transfer print data obtained by the image processing to said printer, and
    said printer comprises a fourth communication unit adapted to receive the print data from said processor and to transmit error information to said processor.

3. The system according to claim 2, wherein during the image read by said image reader, the image processing by said image processing unit, or the printing operation by said printer, if said processor receives from said printer error information indicating that said trailing edge detecting unit of said printer detects the trailing edge of the paper sheet, said processor terminates the read operation by said image reading unit of said image reader and returns said image reading unit to an initial standby position.

4. The system according to claim 2, wherein during the image read by said image reader, the image processing by said image processing unit, or the printing operation by said printer, said processor checks a status of a signal line between said processor and said printer and, if said processor determines from the status of said signal line that said trailing edge detecting unit of said printer detects the trailing edge of the paper sheet and processor terminates the read operation by said image reading unit of said image reader and returns said image reading unit to an initial standby position.

5. The system according to claim 2, wherein said third communication unit of said processor and said fourth communication unit of said printer perform communications by using a bidirectional parallel interface complying with IEEE 1284.

6. A control method of an image forming system comprising an image reader having an image reading unit adapted to photoelectrically read an image of an original and convert the read image into electrical image data, a printer, and a processor, comprising:

reading an image of the original and converting the read image into electrical image data by using said image reader;

monitoring a trailing edge of a paper sheet;

printing the read image onto a paper sheet based on the electrical image data by using said printer;

determining whether or not the trailing edge of the paper sheet is detected; and terminating said reading by using said processor and returning the image reading unit to an initial standby position in a case where the trailing edge of the paper sheet is detected during said printing.

7. The method according to claim 6, further comprises:

a first communicating of transferring the image data to said processor;

a second communicating of receiving the image data transferred from said image reader, an image processing of performing predetermined image processing for the received image data to generate print data;

a third communicating of transferring the print data obtained in said image processing step to said printer;

a fourth communicating of receiving the print data from said processor; and a fifth communicating of transmitting error information to said processor if an error occurs, wherein said printing comprises printing the print data received in said fourth communicating onto the paper sheet, and said terminating comprises transmitting a read operation termination instruction to said image reader if error information is transmitted in said fifth communicating.

8. The method according to claim 7, wherein while said reading, said image processing, or said printing is in operation, if error information indicating that said determining determines the detection of the trailing edge of the paper sheet is transmitted in said fifth communicating, said termination comprises terminating the read operation in said reading and returning said image reading unit to an initial standby position.

9. The method according to claim 7, wherein while said reading, said image processing, or the printing is in operation, said terminating checks a status of a singal line between said processor and said printer and, if it is determined in said determining that the trailing edge of the paper sheet is detecte, said terminating comprises terminating the read operation in said image reading and returning said image reading unit to an initial standby position.

10. The method according to claim 7, wherein said third to fifth communicating steps comprise performing communications by using a bidirectional parallel interface complying with IEEE 1284.

11. An image forming apparatus comprising:

an image reader unit adapted to read an image of an original, said image reader comprising an image reading unit adapted to photoelectrically read the image of the original and convert the read image into electrical image data, a printer unit adapted to print the image read by said image reader unit onto a paper sheet based on the electrical image data, said printer unit comprising a trailing edge detecting unit adapted to detect a trailing edge of the paper sheet;

a determining unit adapted to determine whether or not said trailing edge detecting unit detects the trailing edge of the paper sheet; and a processor unit adapted to terminate the read operation by said image reader unit and return said image reading unit to an initial standby position in a case where said determining unit determines that said trailing edge detecting unit detects the trailing edge of the paper sheet during the printing operation by said printer unit.

12. A computer program product comprising a computer usable medium having computer readable program code means embodied in said medium for a control method of an image forming system comprising an image reader having an image reading unit adapted to photoelectrically read an image of an original and convert the read image into electrical image data, a printer, and a processor, said product including:

first computer readable program code means for reading an image of the original and converting the read image into electrical image data by using said image reader;

second computer readable program code means for detecting a trailing edge of a paper sheet;

third computer readable program code means for printing the read image onto a paper sheet based on the electrical image data by using said printer;

fourth computer readable program code means for determining whether or not the trailing edge of the paper sheet is detected; and fifth computer readable program code means for terminating the read operation by said image reader and returning the image reading unit to an initial standby position in a case where the trailing edge of the paper sheet is detected during the printing operation by said printer.

* * * * *